(12) United States Patent
Kiuchi et al.

(10) Patent No.: US 8,244,533 B2
(45) Date of Patent: Aug. 14, 2012

(54) SPEECH RECOGNITION PERFORMANCE IMPROVEMENT METHOD AND SPEECH RECOGNITION DEVICE

(75) Inventors: Shingo Kiuchi, Iwaki (JP); Nozomu Saito, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 2389 days.

(21) Appl. No.: 10/730,767

(22) Filed: Dec. 8, 2003

(65) Prior Publication Data

US 2004/0162727 A1 Aug. 19, 2004

(30) Foreign Application Priority Data

Dec. 12, 2002 (JP) ................................. 2002-360336

(51) Int. Cl.
*G10L 15/00* (2006.01)
*G10L 15/04* (2006.01)
(52) U.S. Cl. ........................ 704/253; 704/251
(58) Field of Classification Search .................. 704/231, 704/233, 251, 253, 214–215
See application file for complete search history.

(56) References Cited

U.S. PATENT DOCUMENTS

| | | | | |
|---|---|---|---|---|
| 4,885,791 A * | 12/1989 | Fujii et al. | ...................... | 704/254 |
| 5,457,768 A * | 10/1995 | Tsuboi et al. | ................. | 704/231 |
| 5,596,679 A * | 1/1997 | Wang | ........................... | 704/236 |
| 5,956,671 A * | 9/1999 | Ittycheriah et al. | ........... | 704/203 |
| 6,216,103 B1 * | 4/2001 | Wu et al. | ....................... | 704/253 |
| 6,236,970 B1 * | 5/2001 | Imai et al. | ..................... | 704/278 |
| 6,317,711 B1 * | 11/2001 | Muroi | ........................... | 704/253 |
| 6,324,509 B1 * | 11/2001 | Bi et al. | ......................... | 704/248 |
| 6,343,269 B1 * | 1/2002 | Harada et al. | ................. | 704/243 |
| 6,397,180 B1 * | 5/2002 | Jaramillo et al. | ............ | 704/252 |
| 6,493,668 B1 | 12/2002 | Brandman | | |
| 6,920,421 B2 * | 7/2005 | Pao | ................................ | 704/211 |
| 6,975,993 B1 * | 12/2005 | Keiller | ......................... | 704/275 |
| 7,149,689 B2 * | 12/2006 | Yacoub | ........................ | 704/255 |

FOREIGN PATENT DOCUMENTS

| | | |
|---|---|---|
| JP | 05-094197 | 4/1993 |
| JP | 06-083388 | 3/1994 |
| JP | 2003-280678 | 10/2003 |

OTHER PUBLICATIONS

Singh et al. "Speech in Noisy Environments: Robust Automatic Segmentation, Feature Extraction, and Hypothesis Combination," IEEE Conference on Acoustics, Speech and Signal Processing, Salt Lake City, UT, May 2001, pp. 273-276.*
Japanese Office Action dated Sep. 2, 2008 in reference to Application No. JPA 2002-360336.

* cited by examiner

*Primary Examiner* — James Wozniak
(74) *Attorney, Agent, or Firm* — Brinks Hofer Gilson & Lione

(57) ABSTRACT

Speech recognition performance is improved without changing a speech recognition engine. A speech data generation section generates, from speech data for which speech recognition is to be performed, a plurality of pieces of speech data whose starting positions of the non-speech regions differ. A speech recognition engine performs speech recognition by using each of the pieces of speech data. A totaling/comparison section provides the most numerous recognized result from among a plurality of obtained recognized results.

14 Claims, 6 Drawing Sheets

SPEECH RECOGNITION PERFORMANCE IMPROVEMENT METHOD AND SPEECH RECOGNITION DEVICE

BACKGROUND OF THE INVENTION

1. Field of the Invention

The present invention relates to a speech recognition device and a speech recognition performance improvement method. More particularly, the present invention relates to a speech recognition device for improving speech recognition performance in a noisy environment and a speech recognition performance improvement method therefor.

2. Description of the Related Art

Speech recognition devices, by which an operation of vehicle-mounted devices such as audio devices, navigation systems, etc., is performed using speech, have been put into practical use. FIG. 6 is a block diagram of such a speech recognition device. A microphone 1 for entering speech detects speech by a speaker and generates a speech signal. An A/D converter 2 converts the speech signal into digital form. An operation section 3 instructs the starting of speech recognition by operating a switch (not shown). A speech recognition engine 4 recognizes entered speech when the starting of speech recognition is instructed.

An example of the speech recognition engine 4 is disclosed in Japanese Unexamined Patent Application Publication No. 59-61893. In this conventional technology, speech recognition is performed by comparing a feature pattern for each of a series of single syllables in word entered speech with a standard pattern, and by referring to a word dictionary the recognized result is output as a word having a meaning.

In a case where noise is superimposed on speech data that is entered to a speech recognition system, if the speech data is entered to a speech recognition engine by changing the start position of a speech region, such as a portion of a non-speech region which is a start portion of the data being deleted (by changing the length of the non-speech region), there are cases in which the recognized result changes. That is, even in the case of the same produced speech, the correctness of the recognized result is changed depending on the speech-producing timing (the start position of the speech region).

This phenomenon hardly appears in a case where the magnitude of noise that is superimposed onto speech data, for example, noise inside a vehicle, is sufficiently small with respect to the speech (the S/N ratio is high), but when the magnitude of noise inside a vehicle is large with respect to the speech (the S/N ratio is low), this phenomenon appears conspicuously. The reason why such a phenomenon occurs is that, when the speech recognition engine 4 measures the noise level of the background in a non-speech region *SIT (FIG. 7) and performs a speech recognition process on the speech data of the speech region SIT, that noise level is used. The non-speech region *SIT is a region from the time $t_B$ at which the starting of speech recognition was instructed using a switch to the starting position (speech-producing timing) $t_{ST}$ of the speech region SIT.

Since this measurement of noise data is a measurement at a region of a short time, even in the case of the noise under the same conditions, measured results vary depending on the measurement position. For this reason, the recognized results vary, with the result that the data may be recognized correctly or incorrectly. For example, as shown in FIG. 7, if the noise level is assumed to be an average level of the non-speech region *SIT and speech recognition is performed using speech data in the speech region SIT by taking the noise level into consideration, since the noise level is high at the start point of the non-speech region *SIT in FIG. 7, the shorter the non-speech region *SIT, that is, the earlier the speech-producing timing $t_{ST}$, the higher the average level; and the longer (the later) the speech-producing timing $t_{ST}$, the lower the average level becomes. In the manner described above, the level of the noise to be measured varies depending on the speech-producing timing $t_{ST}$, and as a result, the correctness of the recognized result changes.

The above phenomenon shows a situation in which, even in an environment where a certain degree of S/N is ensured, incorrect recognition occurs due to the timing of the speech production. When viewed from the user side, the recognition performance is decreased, which causes a problem.

In the conventional technology, including the technology of Japanese Unexamined Patent Application Publication No. 59-61893, improvement of the recognition rate is sought by exclusively increasing the recognition accuracy of the speech recognition engine, but there are limits.

SUMMARY OF THE INVENTION

Accordingly, an object of the present invention is to improve the speech recognition performance without changing the speech recognition engine.

In the speech recognition device, a plurality of pieces of speech data whose start positions of the non-speech regions differ are generated from speech data for which speech recognition is to be performed. Speech recognition is performed by using each of the pieces of speech data, and the most numerous recognized result from among a plurality of obtained recognized results is provided as an output. As a result of the above, since the start position of the non-speech region is shifted, although there may happen to be speech data which is recognized incorrectly, if a large number of pieces of speech data are recognized and the numbers thereof are compared, the number of cases in which the speech data is recognized correctly becomes the most numerous. Therefore, by providing the result which is recognized most often, the recognition performance can be improved without changing the recognition engine.

In order to generate a plurality of pieces of speech data whose start positions of non-speech regions differ, the start position of the non-speech region is shifted in sequence from the start position of the speech region to a preceding position by a predetermined time. That is, the input speech signal is A/D-converted at a predetermined sampling speed, and this speech signal is stored in the buffer in the order of sampling. Then, a plurality of pieces of speech data whose start positions of non-speech regions differ is generated by changing the position at which reading from the speech buffer starts.

The speech recognition process of each of the pieces of speech data may be performed by one speech recognition engine, but it takes time. In order to shorten the processing time, a speech recognition engine is provided so as to correspond to each of the pieces of speech data whose start positions of the non-speech regions differ, and the most numerous recognized result from among the recognized results of each speech recognition engine is supplied as an output.

As described above, according to the speech recognition device of the present invention, the speech recognition performance can be improved without changing the speech recognition engine.

As described above, according to the present invention, since a plurality of pieces of speech data whose start positions of the non-speech region differ is generated from speech data for which speech recognition is to be performed, speech recognition is performed by using each of the pieces of speech data, and a plurality of recognized results are obtained. Thus, the recognition performance can be improved without changing the recognition engine.

Furthermore, according to the present invention, by providing a speech recognition engine in such a manner as to correspond to each of the plurality of pieces of speech data, a speech recognition result can be obtained at a high speed, and moreover, recognition performance can be improved.

Furthermore, according to the present invention, the phenomenon of incorrect recognition due to the speech-producing timing when a recognition engine is used in an environment in which a certain degree of S/N or higher (2 to 3 dB or higher) is ensured can be eliminated. When viewed from the user side, this is the same as having the same advantages as the recognition performance being improved in a noisy environment, and thus, the present invention is useful.

BRIEF DESCRIPTION OF THE DRAWINGS

FIG. 1 is a block diagram of a speech recognition device according to a first embodiment of the present invention;

DETAILED DESCRIPTION OF THE PREFERRED EMBODIMENTS

(A.) First Embodiment

Figure 1:
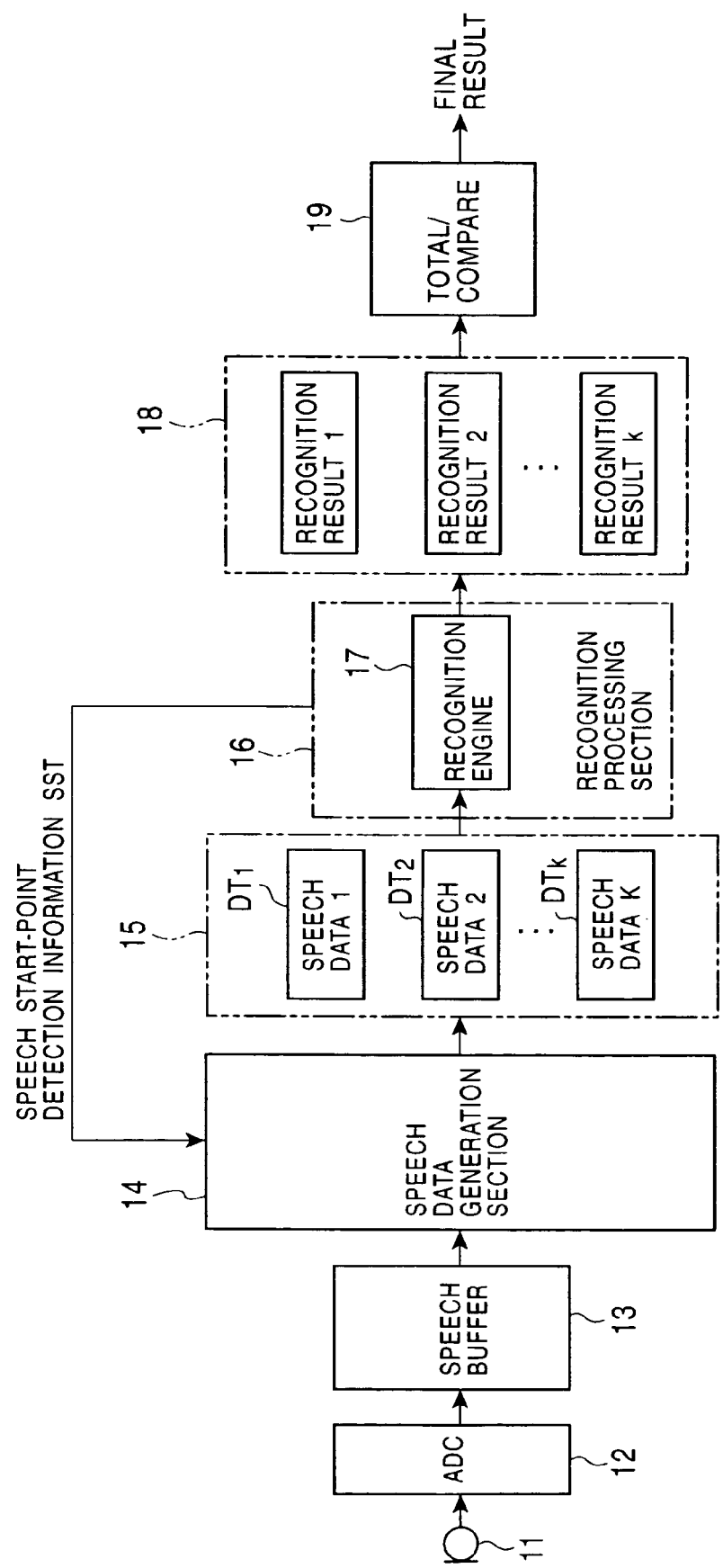
FIG. 1 is a block diagram
Figure 2:
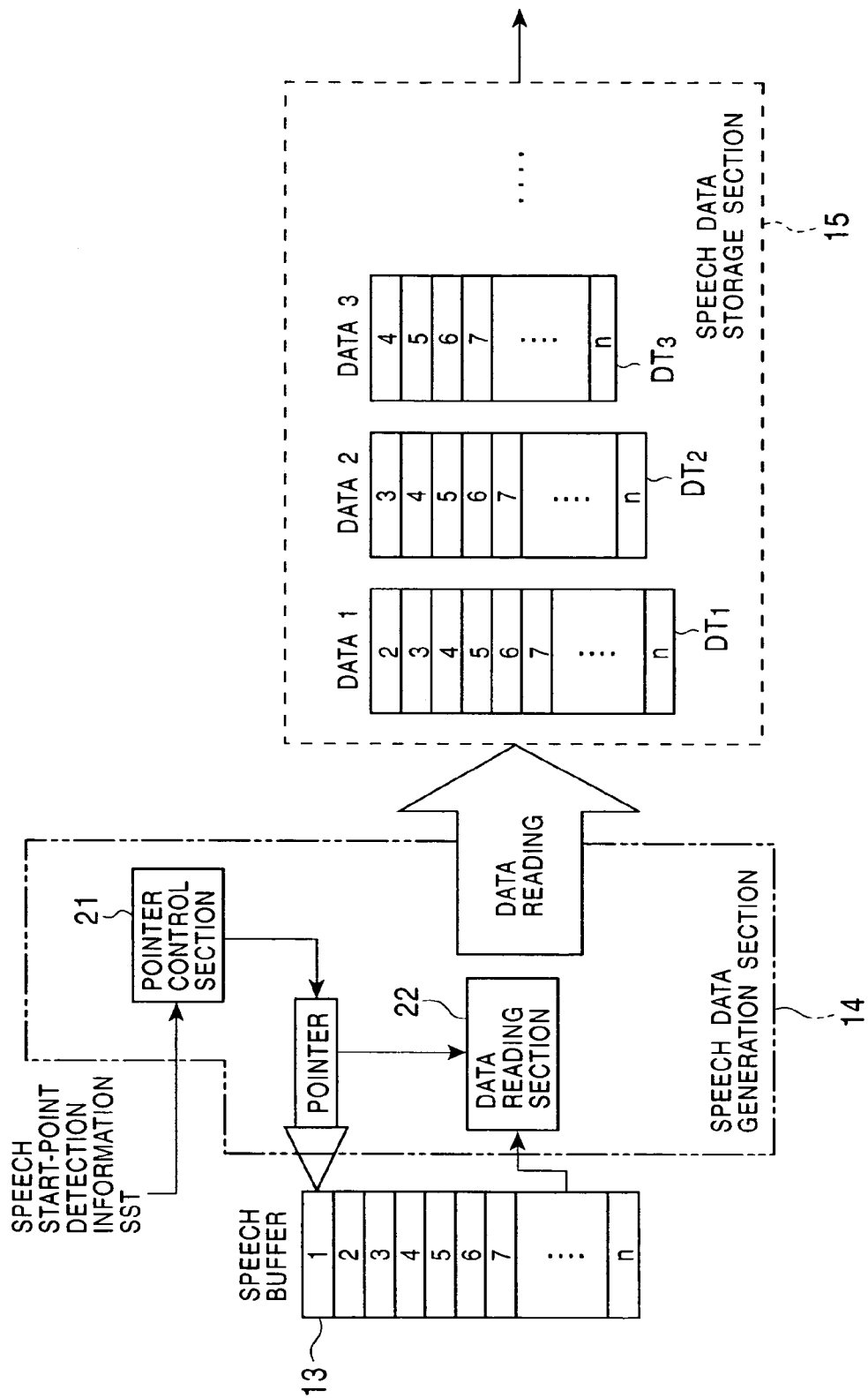
FIG. 2 is an illustration of a speech data generation section.
Figure 3:
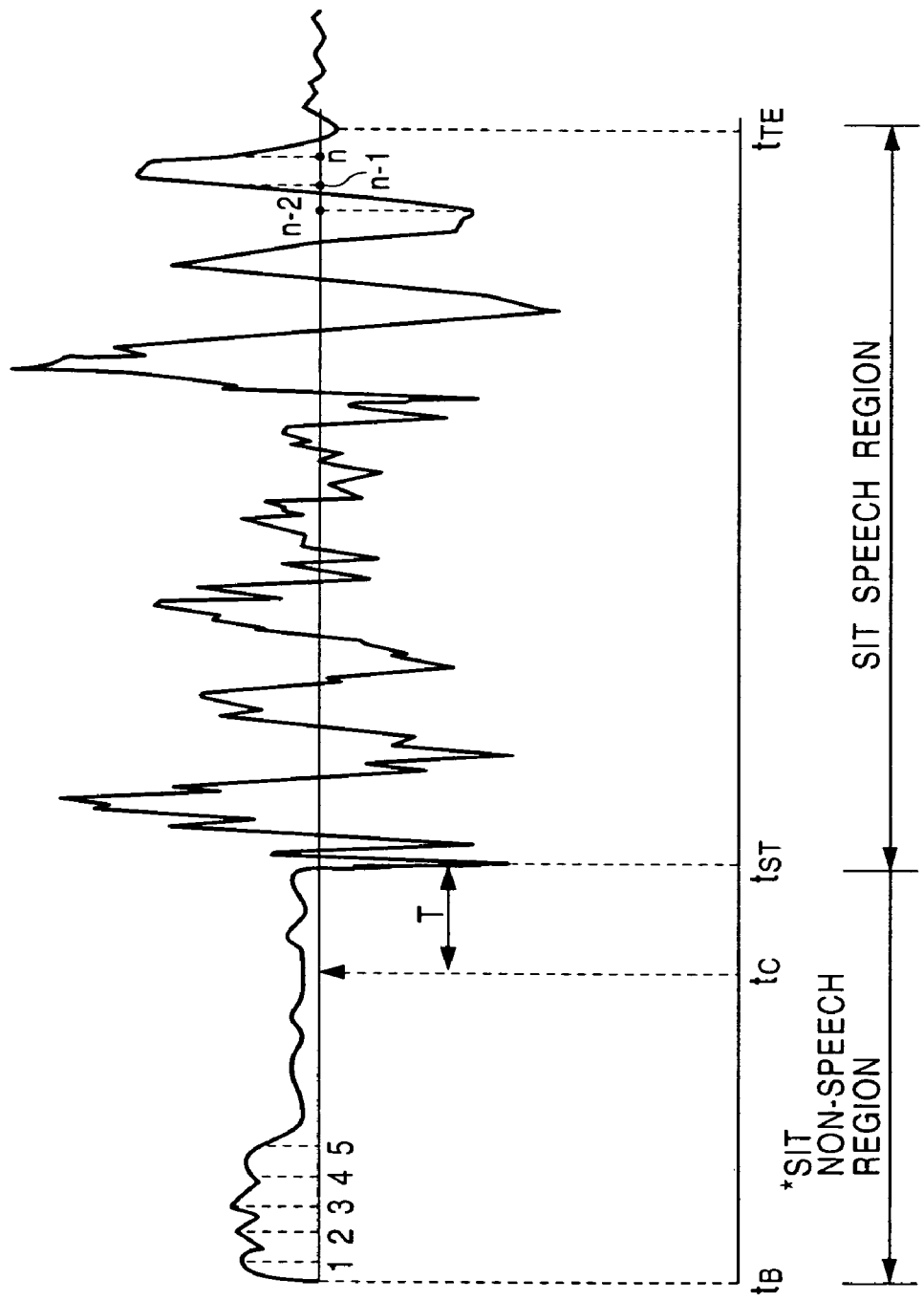
FIG. 3 is an illustration of a speech signal.

FIG. 1 is a block diagram FIG. 1 is a block diagram of a speech recognition device according to a first embodiment of the present invention. FIG. 2 is an illustration of a speech data generation section. When the starting of speech recognition is instructed by operating a switch, a microphone 11 for entering speech detects speech by a speaker and generates a speech signal. An A/D converter 12 performs A/D conversion on the speech signal (see FIG. 3) at a predetermined sampling speed. A speech buffer 13 stores the A/D-converted speech data in the order of sampling. The speech data is generated in such a manner that, as shown in FIG. 3, a speech signal (noise) of the non-speech region *SIT and a speech signal of the speech region SIT are sampled chronologically, and these are assigned with a number 1 to n in sequence and are stored in sequence in the speech buffer 13, as shown in FIG. 2. The data with an earlier number is data of the non-speech region *SIT, and the data with a later number is data of the speech region SIT.

A speech data generation section 14 generates a plurality of pieces of speech data DT1, DT2, DT3, . . . whose starting positions of the non-speech regions differ, by shifting the position at which reading from the speech buffer 13 starts, and stores the plurality of pieces of speech data in a speech data storage section 15. The shift point of the reading start position is from the start position $t_{ST}$ of the speech region SIT back to a position $t_C$ preceding $t_{ST}$ by the predetermined time T, as shown in FIG. 3. A speech recognition engine 17 of a recognition processing section 16 identifies the start position $t_{ST}$ of the speech region SIT, determines the final shift position $t_c$ by using the start position $t_{ST}$, and provides it as speech start-point detection information SST. The speech start-point detection information SST is obtained each time recognition processing is performed on one piece of speech data. The speech start-point detection information when recognition processing is performed on the first speech data may be used, and information such that speech start-point detection information for several pieces of data from the start is averaged may be used.

Referring to FIG. 2, a pointer control section 21 of the speech data generation section 14 receives the speech start-point detection information SST (=the final shift position $t_C$ of the reading start), which is supplied from the speech recognition engine 17. The pointer control section 21 shifts the reading position (pointer) in sequence, and supplies the reading position to a data reading section 22. The data reading section 22 reads, from the speech buffer 13, sampling data on the basis of the position indicated by the specified pointer, and stores the sampling data in the speech data storage section 15. When the reading of one piece of speech data is completed, the pointer control section 21 shifts the reading start position by one piece of sampling data in order to shift the reading position (pointer) in sequence, and supplies the reading position to the data reading section 22. The data reading section 22 reads, from the speech buffer 13, sampling data on the basis of the input position indicated by the pointer, and stores the sampling data in the speech data storage section 15. Hereafter, each time the reading of the speech data is completed, the reading position (pointer) is shifted to read the speech data. When the reading position (pointer) becomes equal to the final shift position $t_c$, the process of generating the speech data is completed.

Concurrently with the above, the speech recognition engine 17 of the recognition processing section 16 performs a speech recognition process by using the first speech data DT1, detects the start position $t_{ST}$ of the speech region SIT, and generates the speech start-point detection information SST. Then, the recognized result (recognized result 1) is stored in a recognized result storage section 18.

Next, the speech recognition engine 17 performs a speech recognition process by using the second piece of speech data DT2 and stores the recognized result 2 in the recognized result storage section 18. Hereafter, in a similar manner, the recognized results 1 to k of all the speech data DT1 to DTk are stored in the recognized result storage section 18.

Figure 4:
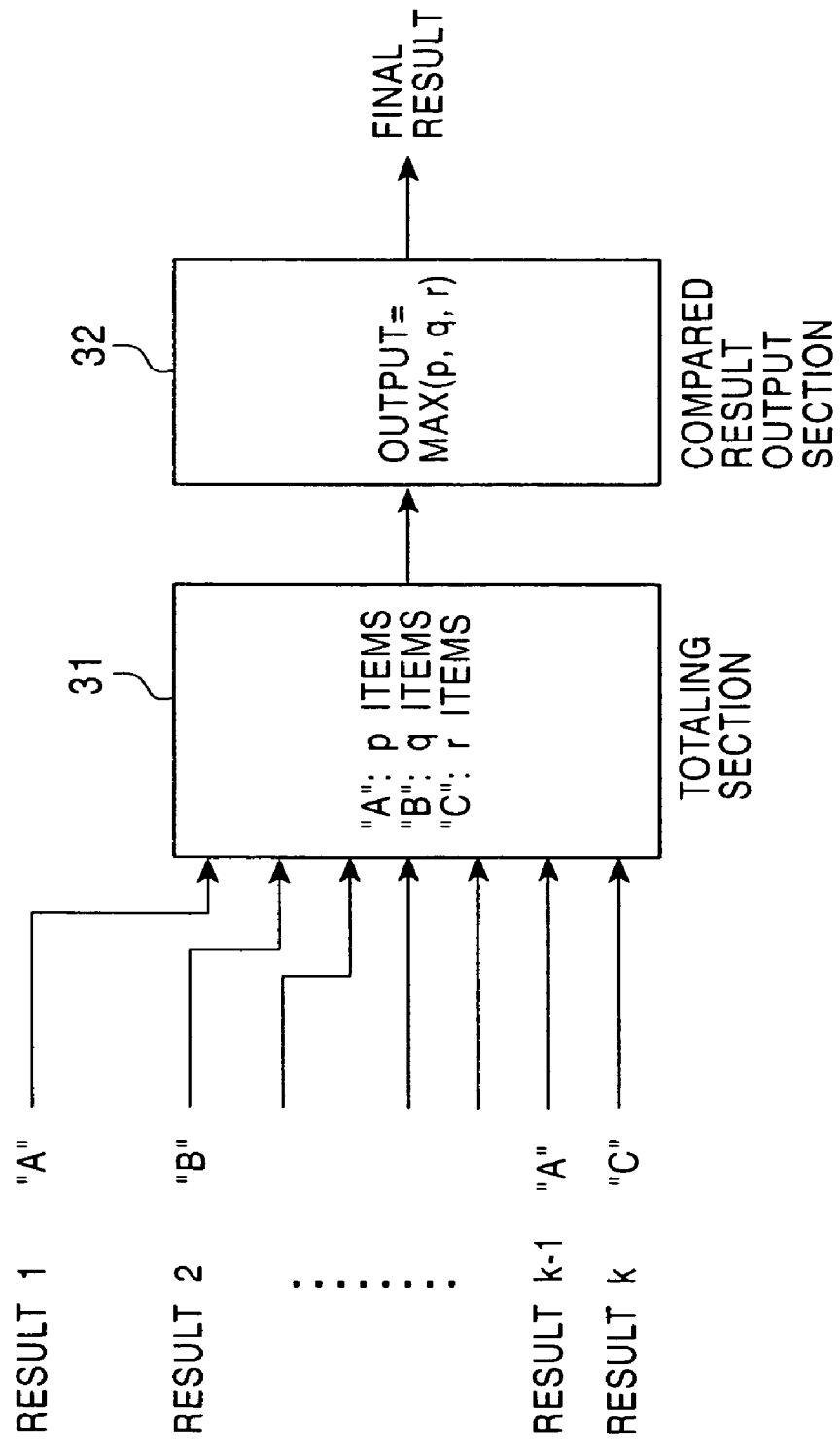
FIG. 4 is a block diagram of a totaling section and a comparison section.

When the recognition of all the speech data DT1 to DTk is completed, a totaling/comparison section 19 provides, as the final result, the most numerous recognized results from among a plurality of the obtained recognized results. FIG. 4 is a block diagram of the totaling/comparison section 19, which has a totaling section 31 and a compared result output section 32. The totaling section 31 totals the number for each compared result. In FIG. 4, the numbers of compared results A, B, and C are p, q, and r, respectively. The compared result output section 32 provides, as the final recognized result, the recognized result corresponding to the maximum value from among p, q, and r.

As described above, according to the first embodiment, since the start position of the non-speech region is shifted, although there may happen to be speech data which is recognized incorrectly due to the influence of noise, the number of cases which the speech recognition engine, that correctly recognizes speech data when noise is not present, recognizes correctly becomes the most numerous if a large number of pieces of speech data are recognized and the numbers thereof are compared. Therefore, by providing the result which is recognized most often, the recognition performance can be improved without changing the recognition engine.

(B) Second Embodiment

Figure 5:
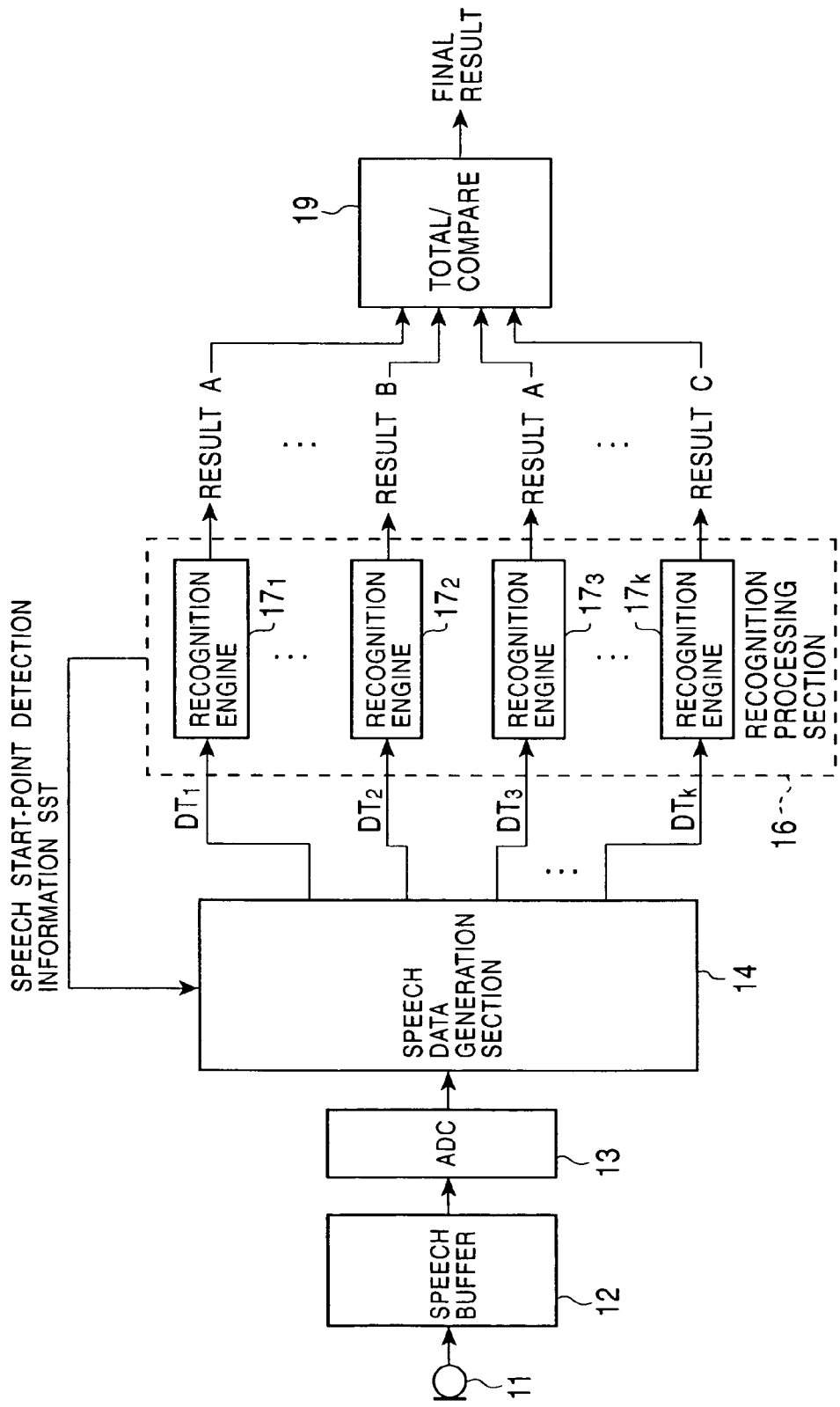
FIG. 5 is a block diagram of a speech recognition device according to a second embodiment of the present invention.
Figure 6:
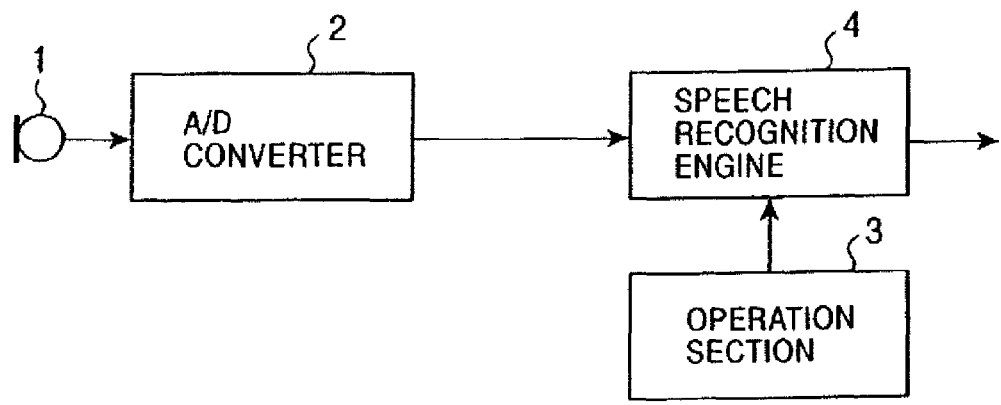
FIG. 6 is a block diagram of a conventional speech recognition device.
Figure 7:
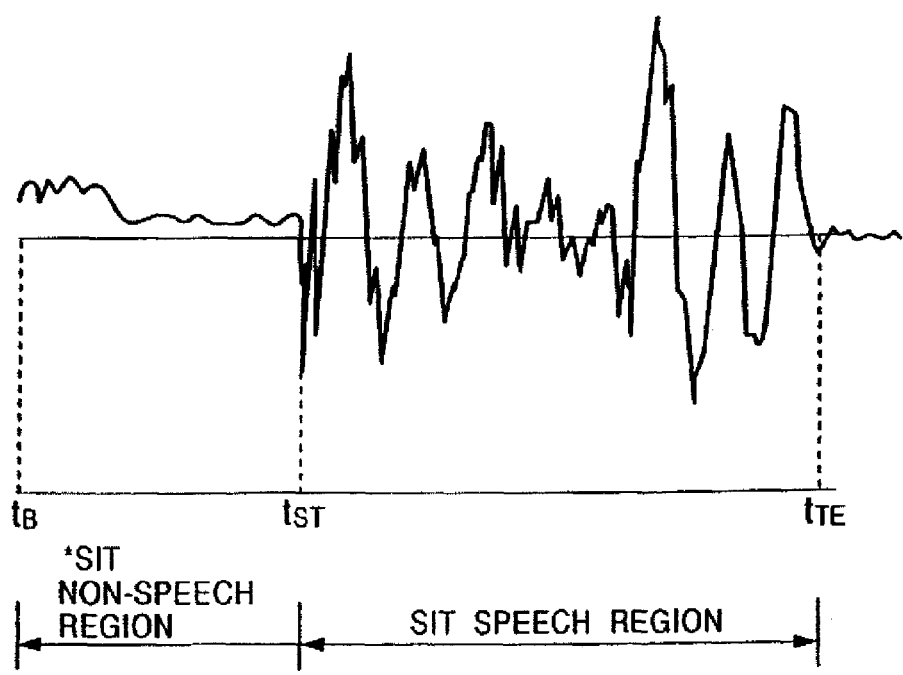
FIG. 7 is an illustration of a speech region and a non-speech region.

FIG. 5 is a block diagram of a speech recognition device according to a second embodiment of the present invention. Components in FIG. 5 which are the same as those in FIG. 1 in the first embodiment are designated with the same reference numerals. The points differing from those of the first embodiment are as follows:

(1) The speech data storage section 15 for storing the speech data DT1 to DTk is omitted, (2) k recognition engines $17_1$ to $17_k$ are provided so as to correspond to k pieces of speech data received from the speech data generation section 14, (3) The recognition engines $17_1$ to $17_k$ perform a speech recognition process on k pieces of speech data and provide each of the recognition results A, B, C . . . to the totaling/comparison section 19, and (4) The totaling/comparison section 19 supplies, as the final recognized result, the most numerous recognized result from among the recognized results of the recognition engines $17_1$ to $17_k$.

As a result of providing k speech recognition engines in this manner, a speech recognition result can be obtained at a high speed, and moreover, recognition performance can be improved.

What is claimed is:

1. A method for use with a speech recognition device for improving speech recognition performance, said method comprising:

identifying a start position of a speech region of speech data for which speech recognition is to be performed;

generating, from said speech data for which speech recognition is to be performed, a plurality of pieces of speech data including said speech region and a varying period of a preceding non-speech region, where start positions of non-speech regions differ for the plurality of pieces of speech data;

performing speech recognition using each of said pieces of speech data to obtain a plurality of recognized results; and identifying a most numerous recognized result from among the plurality of obtained recognized results;

wherein, by sequentially shifting the start position of said non-speech region from the start position of the speech region back to a position preceding by a predetermined time, a plurality of pieces of speech data whose start positions of non-speech regions differ are generated from said speech data for which speech recognition is to be performed.

2. A method according to claim 1, wherein the information of the start position of said speech region is provided by a speech recognition engine which performs said speech recognition.

3. A method according to claim 2, wherein the information of the start position of said speech region is obtained by performing a recognition process on a first speech data by using said speech recognition engine, or is obtained by averaging speech data for several pieces of data from the start which have been subjected to the recognition processing.

4. A method according to claim 1, wherein a plurality of pieces of speech data whose start positions of non-speech regions differ are generated in such a manner that analog-to-digital conversion is performed on the input signal at a predetermined sampling time interval, the speech signal is stored in sequence in a speech buffer in an order of sampling, and a position at which reading from the speech buffer starts is changed.

5. A method according to claim 4, wherein said predetermined sampling time interval is for one piece of sampling data.

6. A method according to claim 1, wherein a speech recognition engine is provided for each of a plurality of pieces of speech data whose start positions of non-speech regions differ, and the most numerous recognized result from among the recognized results of each speech recognition engine is identified.

7. A speech recognition device comprising:

a speech data generation section for identifying a start position of a speech region of speech data for which speech recognition is to be performed and generating, from said speech data for which speech recognition is to be performed, a plurality of pieces of speech data including said speech region and a varying period of a preceding non-speech region, where start positions of non-speech regions differ for the plurality of pieces of speech data;

a speech recognition engine for performing speech recognition on each of said pieces of speech data to obtain a plurality of recognized results; and a recognized result selection section for selecting a most numerous recognized result from among the plurality of obtained recognized results;

wherein said speech data generation section generates a plurality of pieces of speech data whose start positions of non-speech regions differ from speech data for which speech recognition is to be performed by sequentially shifting the start position of said non-speech region to a position preceding by a predetermined time from the start position of the speech region.

8. A speech recognition device according to claim 7, wherein the information of said start position of the speech region is obtained by performing a recognition process on a first speech data by using said speech recognition engine, or is obtained by averaging data of speech data for several pieces of data from the start, which have been subjected to the recognition processing.

9. A speech recognition device according to claim 7, further comprising:

an analog to digital converter for converting an input speech signal from analog to digital at a predetermined sampling time interval; and a speech buffer for storing the converted speech data in an order of sampling, wherein said speech data generation section generates a plurality of pieces of speech data whose start positions of non-speech regions differ, by changing positions at which reading from the speech buffer starts.

10. A speech recognition device according to claim 9, wherein said predetermined sampling time interval is for one piece of sampling data.

11. A speech recognition device for improving speech recognition performance, said speech recognition device comprising:

a speech data generation section for identifying a start position of a speech region of speech data for which speech recognition is to be performed and generating, from said speech data for which speech recognition is to be performed, a plurality of pieces of speech data including said speech region and a varying period of a preceding non-speech region, where start positions of non-speech regions differ for the plurality of pieces of speech data;

a speech recognition engine, for performing speech recognition on the speech data, provided for each of a plurality of pieces of speech data whose start positions of non-speech regions differ in order to obtain a plurality of recognized results; and a recognized result section, for selecting and providing as an output a most numerous recognized result from among the plurality of obtained recognized results;

wherein said speech data generation section generates, from speech data for which speech recognition is to be performed, a plurality of pieces of speech data whose start positions of non-speech regions differ, by sequentially shifting the start position of said non-speech region from the start position of the speech region back to a position preceding by a predetermined time.

12. A speech recognition device according to claim 11, further comprising:

an analog to digital converter for converting an input speech signal from analog to digital at a predetermined sampling time interval; and a speech buffer for storing the converted speech data in an order of sampling, wherein said speech data generation section generates a plurality of pieces of speech data whose start positions of non-speech regions differ, by changing a reading position from the speech buffer, and provides the speech data to each speech recognition engine.

13. A speech recognition device according to claim 12, wherein said predetermined sampling time interval is for one piece of sampling data.

14. A speech recognition device according to claim 11, wherein the information of the start position of said speech region is obtained by performing a recognition process on a first speech data by using said speech recognition engine, or is obtained by averaging data of speech data for several pieces of data from the start, which have been subjected to the recognition processing.

* * * * *